(12) United States Patent
Kessler et al.

(10) Patent No.: US 9,200,700 B2
(45) Date of Patent: Dec. 1, 2015

(54) MOTION CONTROL SYSTEM

(71) Applicant: Kessler Crane, Inc., Plymouth, IN (US)

(72) Inventors: Eric Kessler, Bremen, IN (US); Kevin P Mott, Bremen, IN (US)

(73) Assignee: Kessler Crane, Inc., Plymouth, IN (US)

( * ) Notice: Subject to any disclaimer, the term of this patent is extended or adjusted under 35 U.S.C. 154(b) by 55 days.

(21) Appl. No.: 14/245,010

(22) Filed: Apr. 4, 2014

(65) Prior Publication Data

US 2014/0298937 A1    Oct. 9, 2014

Related U.S. Application Data

(60) Provisional application No. 61/809,053, filed on Apr. 5, 2013.

(51) Int. Cl.
*F16H 57/022*  (2012.01)
*F16H 1/16*  (2006.01)
*F16H 57/12*  (2006.01)

(52) U.S. Cl.
CPC ............. *F16H 57/022* (2013.01); *F16H 1/16* (2013.01); *F16H 2057/0224* (2013.01); *F16H 2057/125* (2013.01); *Y10T 74/19565* (2015.01)

(58) Field of Classification Search
CPC ............ F16H 1/16; F16H 1/32; F16H 29/20; F16H 55/24; F16H 57/12; F16H 57/022; F16H 57/039; F16H 2025/209; F16H 2025/2084; F16H 2057/0213; F16H 2057/0224
USPC .......... 74/425, 395, 396, 409, 63, 125, 89.34, 74/89.14, 117, 124, 606 R, 724, 337.5, 74/390, 813 L See application file for complete search history.

(56) References Cited

U.S. PATENT DOCUMENTS

| | | | | |
|---|---|---|---|---|
| 3,811,335 A | * | 5/1974 | Hunsberger | 74/409 |
| 4,084,756 A | * | 4/1978 | Coxhill | 241/213 |
| 4,261,218 A | * | 4/1981 | Eagan, Sr. | 74/409 |
| 2008/0278578 A1 | * | 11/2008 | Kahn | 348/143 |
| 2012/0241246 A1 | * | 9/2012 | Kuroumaru | 180/446 |

* cited by examiner

*Primary Examiner* — William Kelleher
*Assistant Examiner* — Leonard J Archuleta
(74) *Attorney, Agent, or Firm* — Botkin & Hall, LLP

(57) ABSTRACT

A motion control system is provided where a rotatable driven gear is held by bearings. The bearings are held inside a rotatable cam, where the cam has eccentricity between the outside and inside diameter. The outside diameter is held in a case that contains a driving gear. The backlash of the system is controlled by rotating the cam, which adjusts the center to center distance between the driving and driven gear.

15 Claims, 7 Drawing Sheets

MOTION CONTROL SYSTEM

CROSS REFERENCE TO RELATED APPLICATION

This application claims the benefit of U.S. Provisional Application No. 61/809,053, filed Apr. 5, 2013, the disclosure of which is hereby incorporated by reference.

BACKGROUND OF THE INVENTION

Motion control systems are commonly used in the photographic and videographic industries to provide controlled movement to various types of equipment. For instance, for a given scene, a director may require a camera to move while the camera is tilted and panned all while the focus is being adjusted. While an operator could perform all of these functions manually by holding and manipulating the camera, a high level of precision and reproducibility is difficult, if not impossible. As such, mechanized motion control systems have been developed which allow for precise and repeatable movements.

One basic element of a motion control system is a rotatable axis. The rotatable axis allows movement about one axis, such as a pan axis or a tilt axis. In a common embodiment, these rotatable axes are driven by a worm gear. As with any geared system, slop between the teeth of the respective gears can result in backlash, or lash, which can cause a jittery or uneven rotation. This slop can be minimized in a number of ways and has been the subject of many previous inventions. The prior art systems fail for difficulty in assembly and residual slop or binding of the gears. In many cases, prior systems include a pair of members, one above the worm gear and one below the worm gear, both being independently adjusted to move the worm gear toward or away from the worm. If these two members are adjusted differently, the worm and the worm gear can become unaligned and bind or cause wear on the system. As such, these previous structures are difficult to assemble and maintain. As such, an improved motion control system is needed.

SUMMARY OF THE INVENTION

The present disclosure describes a motion control system having a worm and a gear. The worm is driven by a motor and transfers rotation to the worm gear, which in turn transfers motion to an external element, such as a pan or tilt head. Both the worm and the gear have teeth which interlock. For smooth motion, the gear must be located at a precise distance from the worm; having the worm and gear at an improper distance will result in binding, jittering or wear on the system. The cam controls the center to center distance between the driving and driven gear by moving the bearings that hold the driven gear. The cam moves both bearings in concert to maintain proper alignment. This prevents binding and improper gear mesh, which frequently happens when bearings are adjusted individually.

BRIEF DESCRIPTION OF THE DRAWINGS

A preferred embodiment of this invention has been chosen wherein.

DESCRIPTION OF THE PREFERRED EMBODIMENT

Figure 1:
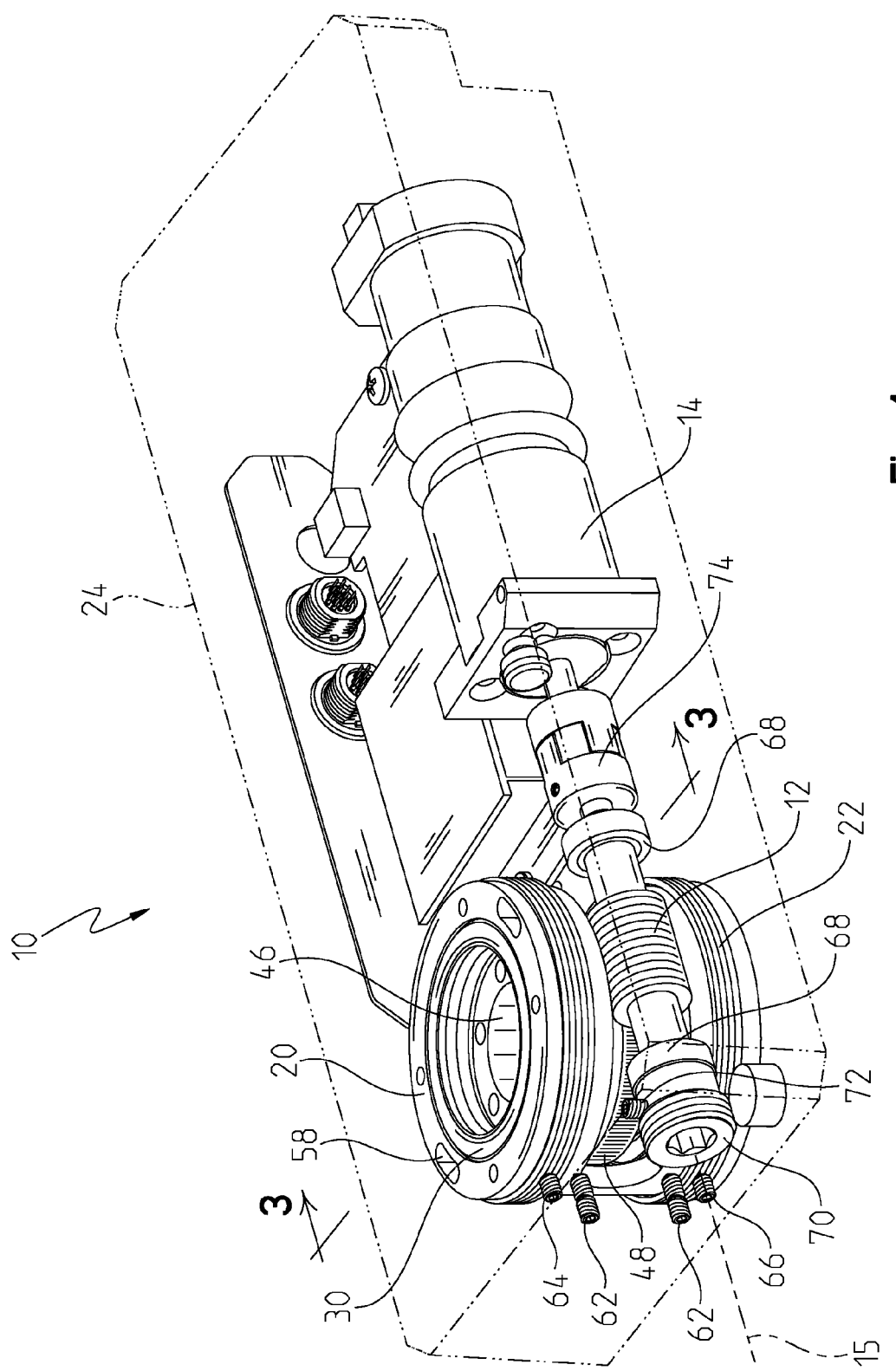
FIG. 1 is a perspective view of the motion control system with the case in transparent.

The present disclosure describes a motion control system 10 which is suitable for providing precise and repeatable rotation to an object as is shown in FIG. 1. For purposes of illustration, the present motion control system 10 is described as used to rotate (such as pan or tilt) photographic equipment. Any reference to such camera equipment is merely illustrative of one use of the motion control system of the present disclosure.

Figure 2:
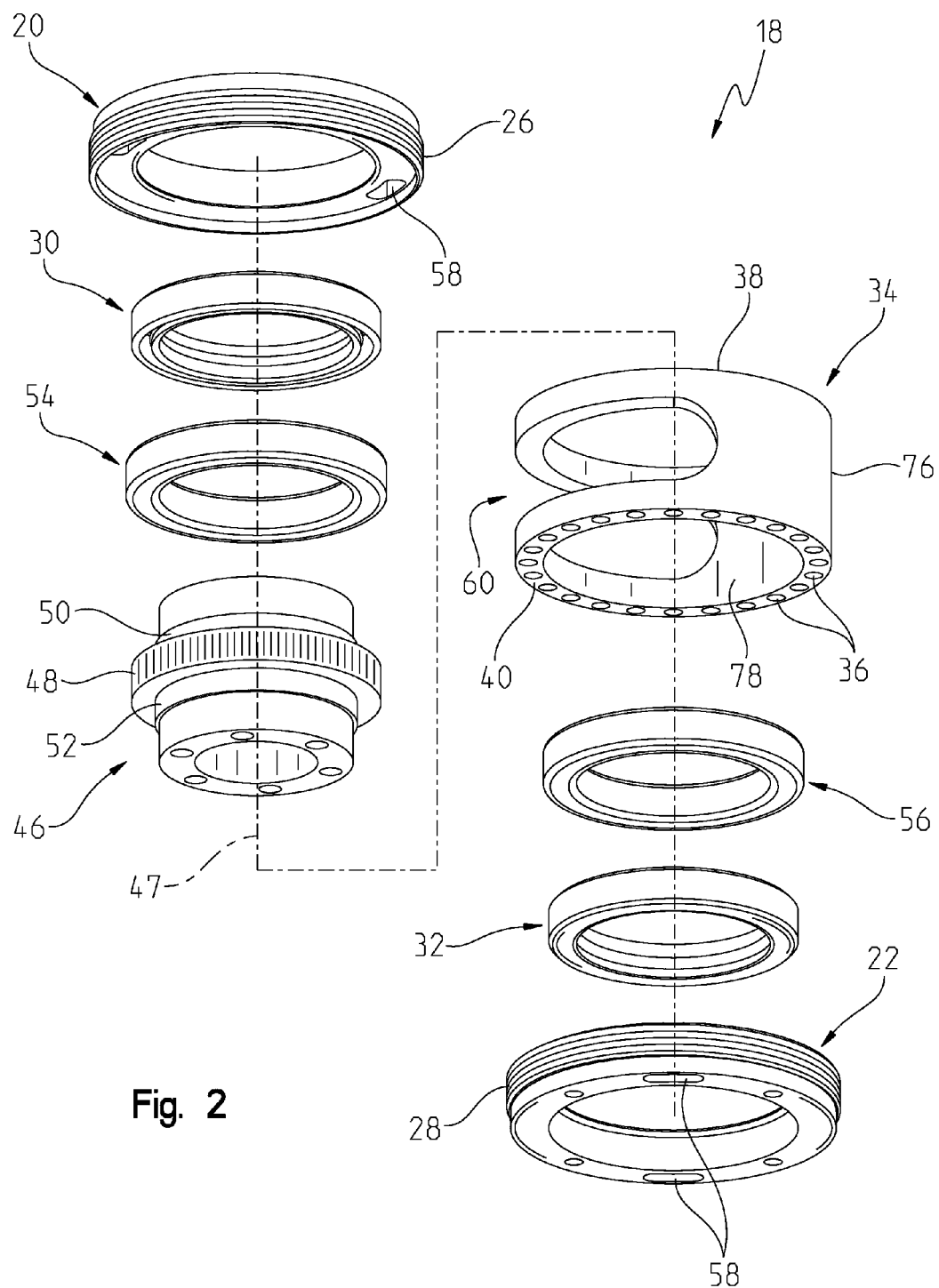
FIG. 2 is an exploded view of the gear assembly.
Figure 3:
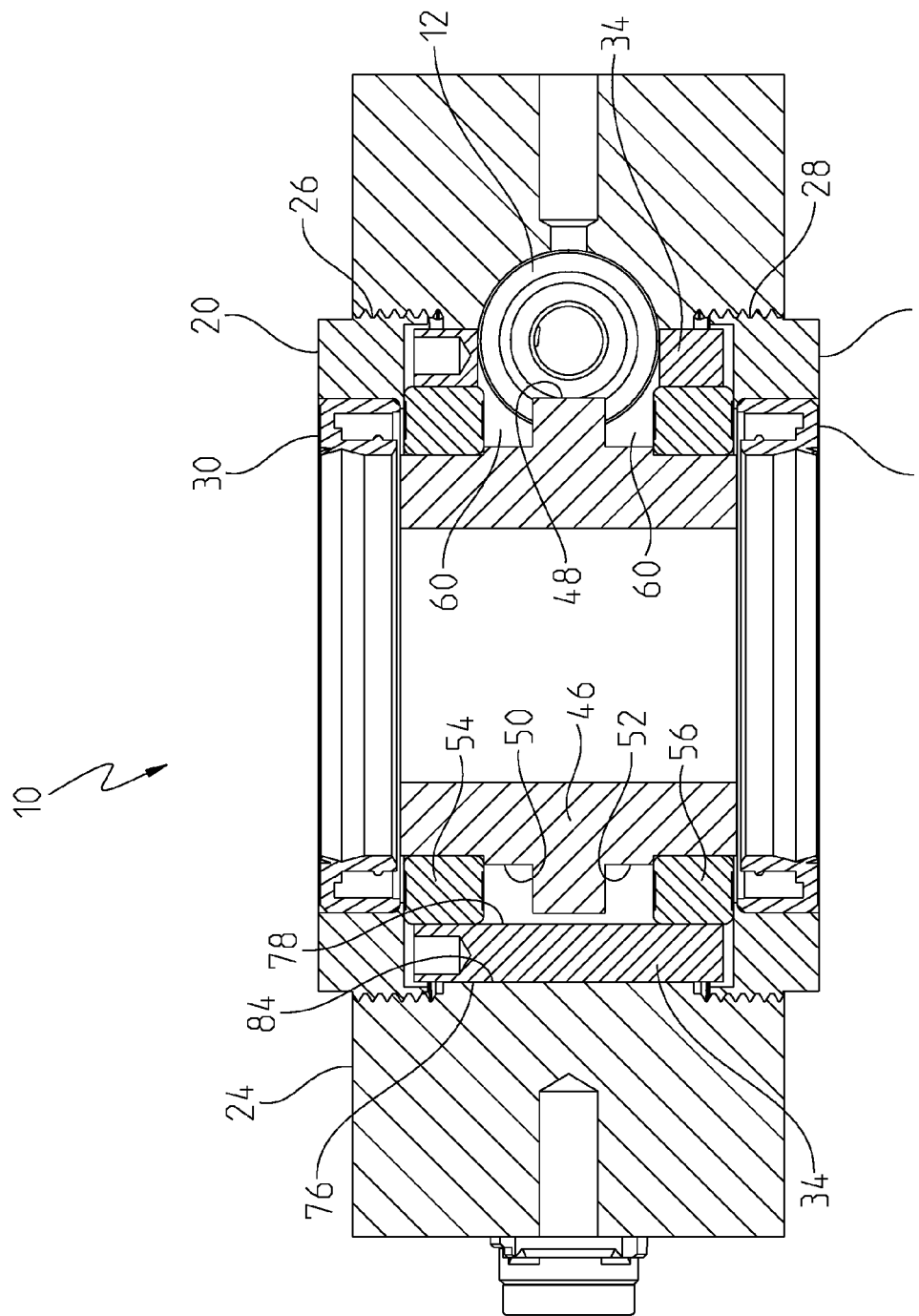
FIG. 3 is section view 3-3 of the motion control system in FIG. 1.
Figure 4:
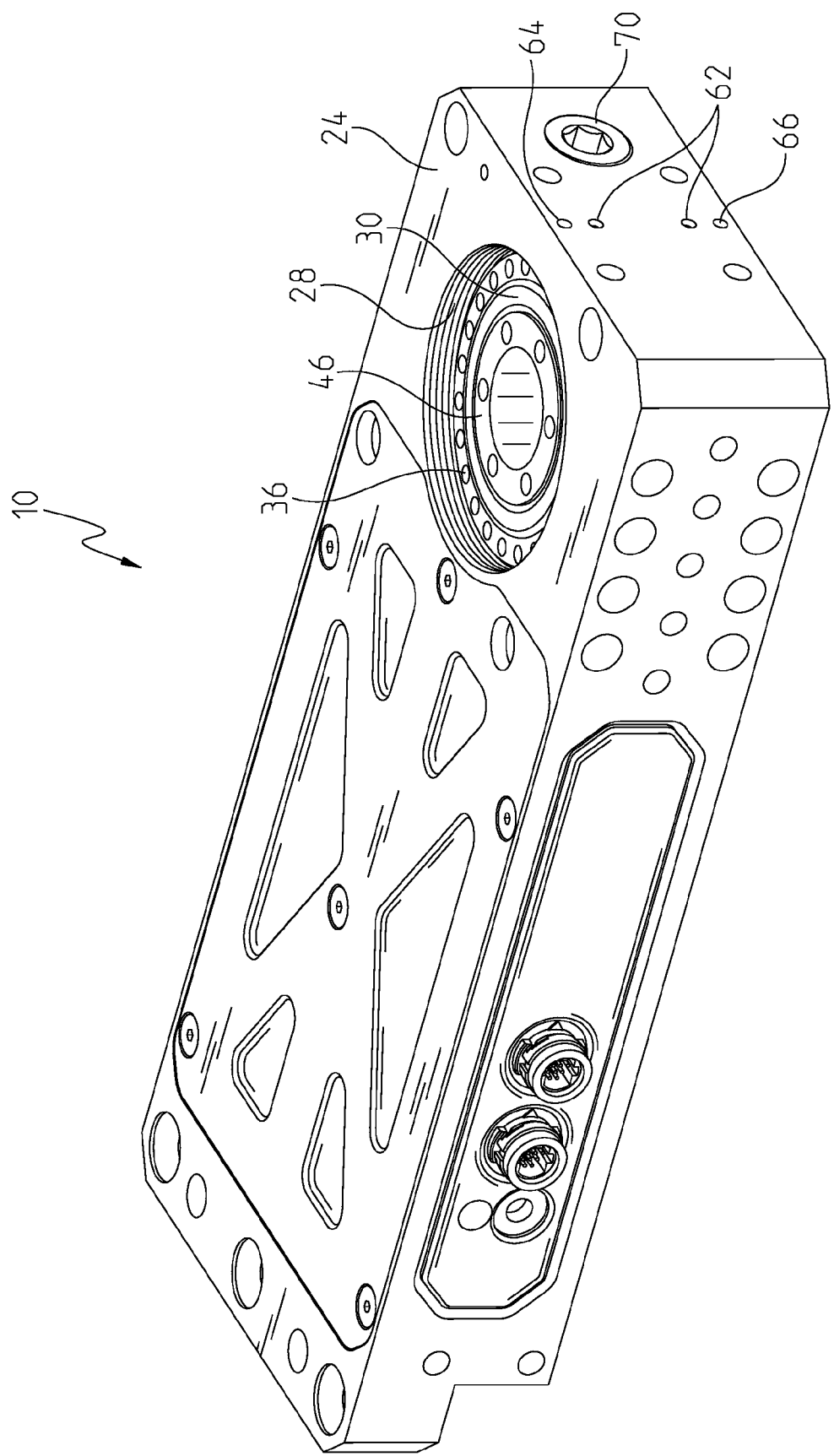
FIG. 4 is a perspective view of the motion control system.

The motion control system 10 described herein is made up of a case 24 and a gearset 18, FIG. 2. The case 24 and gearset 18 are shown in FIG. 4 and FIG. 2. The case includes a worm gear 12 which is driven by a motor 14 as shown in FIG. 1. The worm gear 12 has a central axis 15 about which the worm gear 12 may rotate. The case 24 has a central bore 84 as shown in FIG. 3. The worm gear 12 drives a gear 46 which is housed in a gearset 18. For simplicity, the worm gear 12 and the gear 46 are shown with simplified teeth, though it is appreciated that as built, the worm gear 12 and the gear 46 will both include proper teeth as is well known in the art.

The gearset 18 as shown as an exploded gear assembly in FIG. 2 comprises an upper sleeve 20, an upper oil seal 30, an upper bearing 54, a gear 46, a cam 34, a lower bearing 56, a lower oil seal 32, and a lower sleeve 22. Once assembled as shown in FIG. 3, the gearset 18 is axially constrained with respect to the case 24 on the top by an upper sleeve 20 and on the bottom by a lower sleeve 22. The upper and lower sleeves 20, 22 include threading 26, 28 around the outer perimeter which is mateable with corresponding threading formed in the upper and lower portions of the case 24. The upper sleeve 20 circumscribes an upper oil seal 30, such that the upper oil seal 30 nests in the upper sleeve 20. Similarly, the lower sleeve 22 circumscribes a lower oil seal 32, such that the lower oil seal 32 nests in the lower sleeve 22. The sleeves 20, 22 also provide an axial surface for the top surface of the bearings. The bearings 54, 56 are typically ball bearings, but can be a roller bearing or a bushing. By applying a sufficient thrust pressure on the bearings 54, 56, axial movement of the gear 46 is reduced or eliminated. The sleeves 20, 22 have sufficient clearance to the outside diameter of the cam 76 so that the cam 76 may be selectively rotated, as is shown in FIG. 3.

The cam 34 is axially constrained on the upper end by the upper sleeve 20 and on the lower end by the lower sleeve 22. The cam 34 is generally cylindrical having an upper face 38 and a lower face 40.

Figure 7:
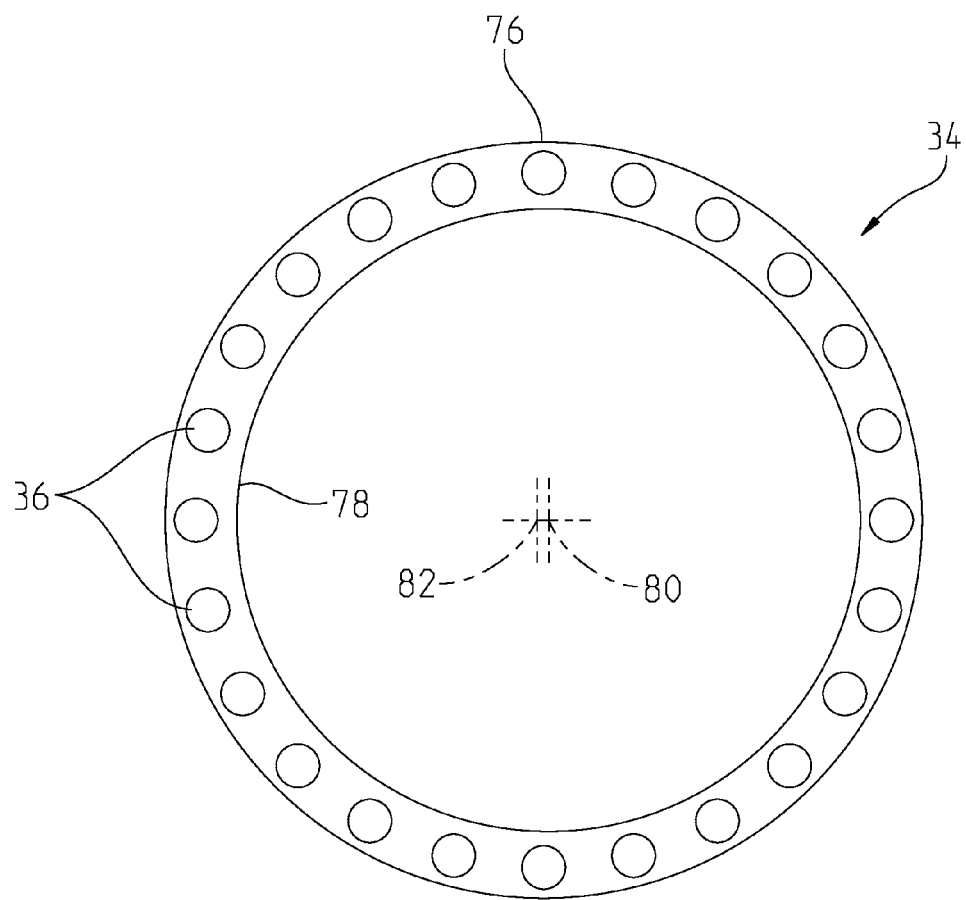
FIG. 7 is a top view of the cam from FIG. 2 showing eccentricity.

The cam 34 is a hollow cylinder defined by an internal diameter 78 and an outer diameter 76. The internal diameter 78 has a first axis 80 and the outer diameter 76 has a second axis 82. The first and second axes 80, 82 are spaced apart as shown in FIG. 7 to generate an eccentricity to the cam 34. The cam 34 includes a series of apertures 36 formed in both the upper and lower faces of the cam 34. The circle defined by the inner diameter 78 is eccentric relative the circle defined by the outer diameter 76. As is shown in FIG. 7, the thickness of the wall on the left side is different than the thickness of the wall on the right side. The outside diameter 76 of the cam is sized to rotatably mate with the central bore 84, FIG. 3 of the case to allow selectively lockable rotation of the cam 34 with respect to the case 24.

The gear 46, FIG. 2 is carried within the cam 34. The gear 46 is generally shaped as a hollow cylinder with a series of protrusions in the outer wall. The most prominent protrusion is the gear teeth 48 that are centrally located on the outer diameter of the gear 46. The teeth of gear 46 mesh with the teeth on worm gear 12. Spaced above and below the teeth 48 on gear 46 are upper and lower protrusions 50, 52, which form a pair of shoulders which locate the inner ring of an upper bearing 54 and a lower bearing 56 respectively. The gear 46 has a central axis 47, center of the teeth 48, and shoulders that locate inner rings of upper and lower bearings 54, 56. The upper and lower bearings 54, 56 are carried within the cam 34 and axially constrain the gear 46. The upper and lower bearings 54, 56 are sized to contact both the inner diameter of the cam 34 and the outer wall of the gear 46, such that the gear is fixed from lateral movement with respect to the inside diameter 78 of the cam 34. The bearings precisely locate the gear 46 within the cam 34. Bushings could also be used in place of bearings. The gear 46 is coaxial with the first axis 80 of the cam 34. The bore 84 in the case is coaxial with the second axis 82 of the cam 34 and when the cam 34 is locked from rotation, it is fixed from lateral movement with respect to the bore 84.

Figure 5:
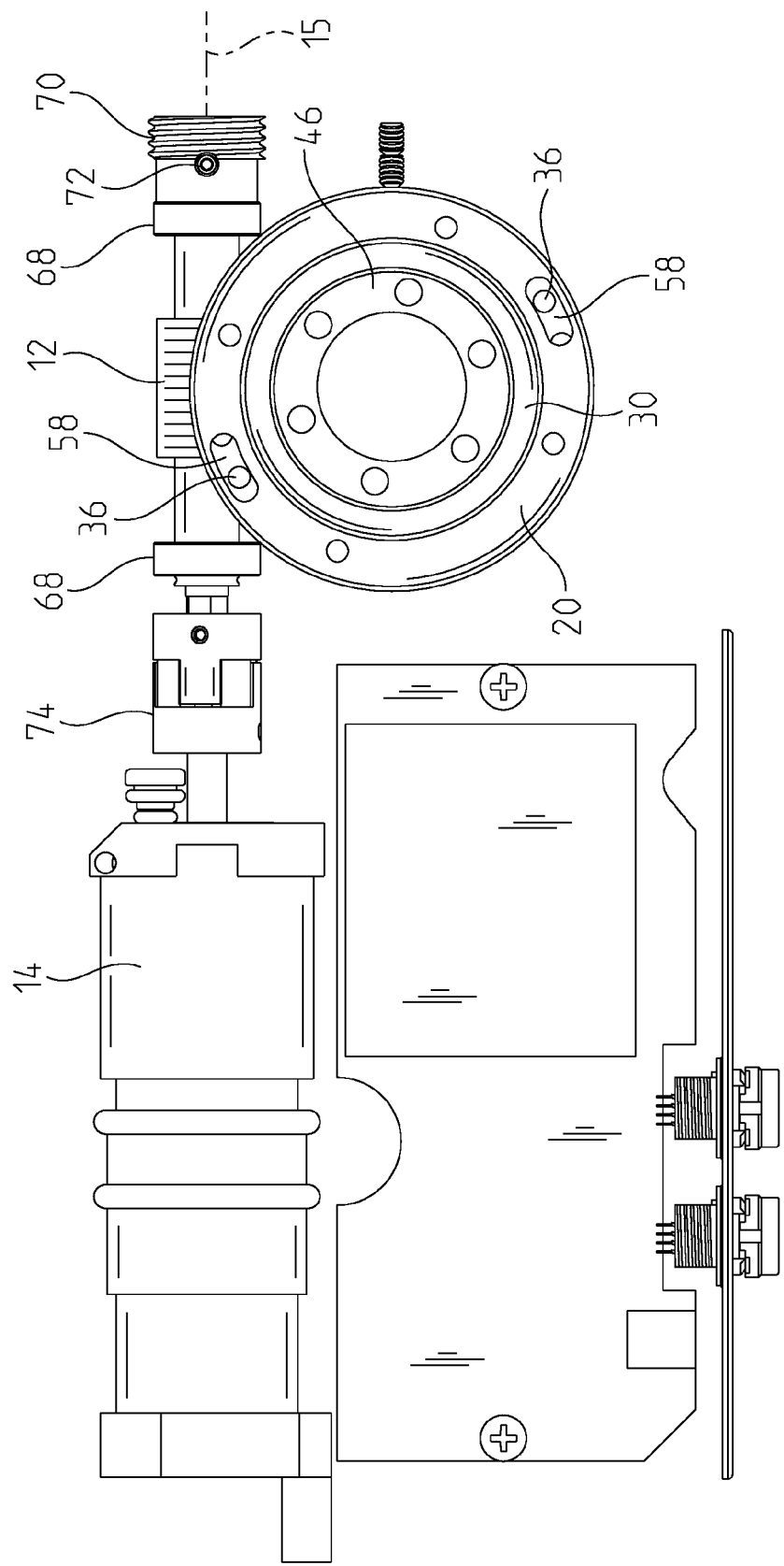
FIG. 5 is a top view of the motion control system without the case.
Figure 6:
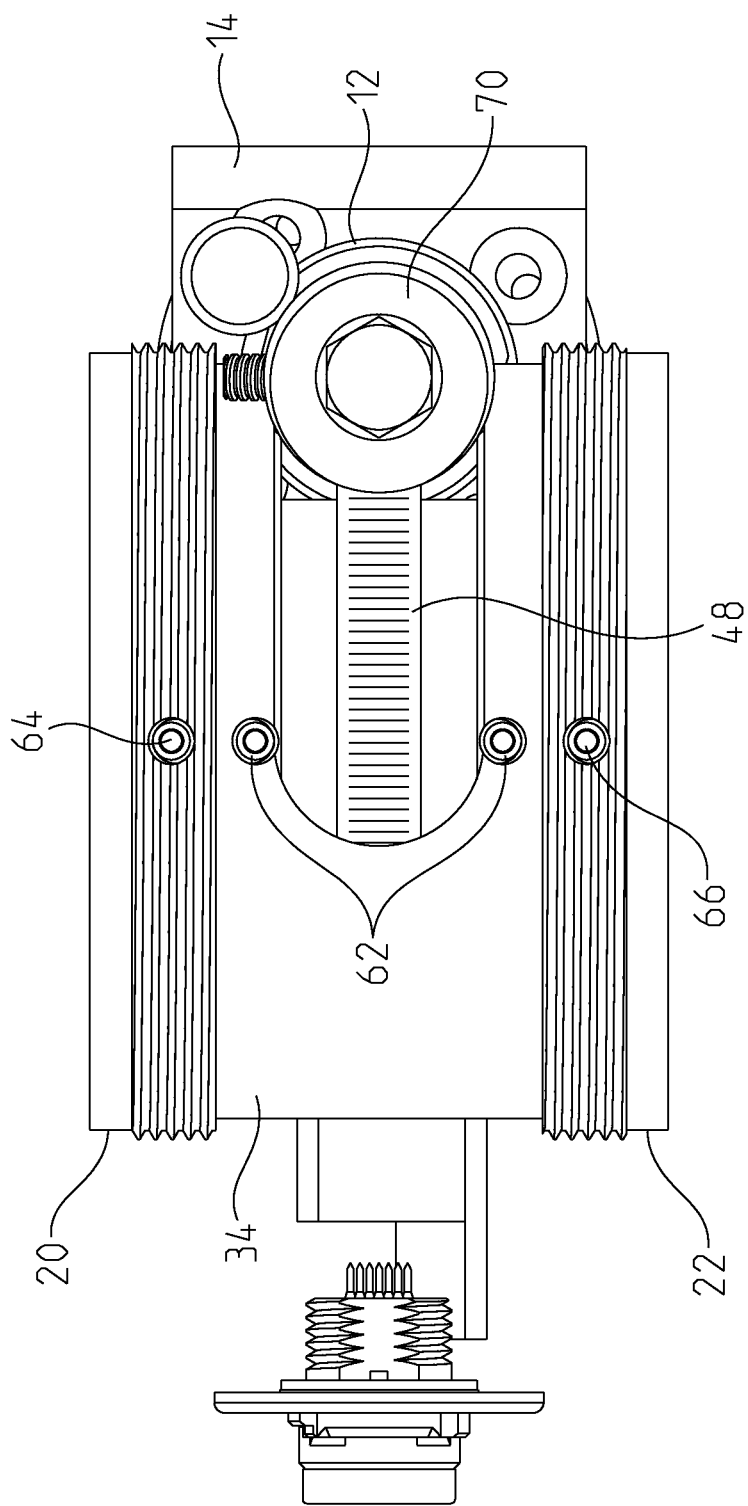
FIG. 6 is a side view of the motion control system without the case.

The upper sleeve 20 and lower sleeve 22 each include slots 58 formed therethrough. These slots 58 provide access to the apertures 36 formed in the cam 34 when the assembly 10 is assembled as is shown in FIG. 5. By passing a tool (not shown) through the slots 58 into the apertures 36, the cam 34 can be rotated relative the case 24, which rotation causes the gear 46 to move toward or away from the worm 12 due to the eccentricity of the cam. Rotating the cam changes the distance between the central axis 47 of the gear 46 and the worm gear 12. In this way, rotation of the cam 34 allows for proper positioning of the gear teeth 48 relative the worm gear 12 so as to allow smooth and consistent rotation. The teeth on worm gear 12 and the teeth 48 on gear 46 are involute shaped teeth moving the axes 47, 15 nearer to each other may be used to eliminate push. While the cam 34 provides for lateral adjustment of the axis 47 of gear 46, the worm gear 12 is fixed from lateral movement with respect to the case. The cam 34 includes an elongate window 60 as shown in FIG. 2, through which window 60 the worm gear 12 can contact the gear teeth 48 as shown in FIG. 3. The window 60 allows the cam 34 to rotate within a certain range while still allowing the worm gear 12 to contact gear teeth 48. The cam 34 is structured and the window 60 is sized such that the cam 34 is sufficiently rigid to maintain a consistent inside diameter 78 and outside diameter 76 as show in FIG. 7. With the cam 34 positioned as desired, the cam is locked into place by a series of set screws 62 as shown in FIG. 1. With the upper sleeve positioned as desired, the upper sleeve 20 is locked in place by a set screw 64. A corresponding set screw 66 locks the lower sleeve 22 in place.

Rotation of the cam 34 provides for lateral positioning of the gear teeth 48 relative the worm gear 12 by only making one adjustment. Smooth operation with long life requires both upper bearing 54 and lower bearing 56 to always be coaxial. Previous systems required independent adjustments of mechanisms on the both the top and bottom of the gear, and if the mechanisms are adjusted improperly, the worm gear 12 and the gear 46 would bind, prematurely wear, or otherwise not function ideally. The present system solves this problem by allowing for unitary adjustment of the top and bottom of gear 46, which simplifies assembly and assures proper functioning.

The case 24 contains a drive motor 14 that is connected to the worm gear 12 via coupling 74. The case 24 also contains mounting and bearings 68 to constrain the worm axially and laterally. The axial endplay of the worm is controlled through a preload screw 70 and is held in place with a set screw 72 as is shown in FIGS. 1 and 5. The case also can contain controls and electronics for position feedback and control of the motor 14. Mounting means are also included such that the system 10 can be mounted to an external structure. Setscrews are threaded into the case 24 that contact the cam 34, upper sleeve 20 and lower sleeve 22 as is shown in FIG. 4. The setscrews 62 maintain the rotated position of the cam along with setscrews 64, 66 to maintain the position of the sleeves 20, 22 after adjustment is performed.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A motion control system for precise and repeatable rotation of an external device, comprising:
   a gearset, having;
      a rotatable driven gear having driven gear teeth around an outside diameter, a central axis about which said driven gear may rotate, said driven gear teeth affixed to said gear;
      a rotatable cam, having an inside diameter surface with a first axis, an outside diameter surface with a second axis, said outside and said inside diameter defining a cam sidewall, said driven gear being rotatably held within said inside diameter surface of said rotatable cam and concentrically rotatable with respect to said inside diameter surface, said first axis coaxial with said central axis of said gear, said first axis eccentrically offset from said second axis, said rotatable cam having a first end face and a second end face, said inside diameter surface terminating at said first and second end faces, said outside diameter surface terminating at said first and second end faces, said first end face being separated from said second end face by a first distance;
   a case, having an upper surface and a lower surface, said upper surface being separated from said lower surface by a second distance;
      a gearset bore extending from said upper surface to said lower surface with a central axis, said gearset bore rotatably containing said outside diameter surface of said cam so that said cam may rotate with respect to said case along its second axis, a portion of said came sidewall located between said driven gear teeth and said gearset bore;
   a driving gear, said driving gear having a central axis and gear teeth adapted to interface said driven gear teeth, said driving gear being rotatable with respect to said case about its central axis, and said driving gear fixed from lateral movement with respect to said case, whereby rotating said cam with respect to said case shifts a relative distance between said central axis of said driving gear and said central axis of said gearset bore.

2. The motion control system of claim 1, said driven gear having an upper portion of said outside diameter and a lower portion of said outside diameter, said upper portion of said outer diameter being separated from said lower portion of said outer diameter by said teeth, said upper and lower portions of said outer diameter being uniformly shifted when said cam is rotated with respect to said case.

3. The motion control system of claim 1, said cam is selectively lockable with respect to said case to fix the location of said central axis of said driven gear with respect to said case.

4. The motion control system of claim 3, said cam having a transverse surface extending between said inside diameter and said outside diameter and located between an upper surface and a lower surface, said transverse surface partially disposed around said cam and defining a window to permit contact of said driving gear to said driven gear; said transverse surface residing inside said gearset bore.

5. The motion control system of claim 4, said transverse surface interrupting a portion of said inside and outside diameter.

6. A motion control system for precise and repeatable rotation of an external device, comprising:
- a gearset, comprising;
  - a rotatable driven gear having driven gear teeth around an outside diameter, a central axis, about which said driven gear may rotate, said driven gear teeth affixed to said gear, said outside diameter adapted to receive a bearing, said bearing circumscribing said outside diameter;
  - said bearing having an inner ring rotatable with respect to an outer ring coaxially circumscribing said inner ring;
  - a rotatable cam, having an inside diameter surface with a first axis and an outside diameter surface with a second axis, said outside and said inside diameter defining a cam sidewall, said first axis eccentrically offset from said second axis, said cam having a transverse surface extending between said inside diameter surface and said outside diameter surface and located between an upper surface and a lower surface, said upper surface and said lower surface separated by a first distance, said transverse surface located intermediate said first lower and upper surface, said transverse surface partially disposed around said cam and defining a window to permit contact of said driving gear to said driven gear, said inside diameter surface mated to said outer ring of said bearing, said inner ring being fixed from longitudinal movement with respect to said outer ring, said bearing being coaxial with said driven gear;
  - a case having an upper surface and a lower surface, said upper surface being separated from said lower surface by a second distance, comprising;
    - a gearset bore with a central axis, said bore rotatably containing said outside diameter surface of said cam so that said cam may rotate with respect to said case along its second axis, a portion of said cam sidewall located between said driven gear teeth and said case bore;
  - a driving gear, said driving gear having a central axis and gear teeth adapted to interface said driven gear teeth, said driving gear being rotatable with respect to said case about its central axis, and said driving gear fixed from lateral movement with respect to said case, whereby rotating said cam with respect to said case changes distance between said central axis of said driven gear and said central axis of said driving gear.

7. The motion control system of claim 6, said cam is selectively lockable with respect to said case to fix the location of said central axis of said driven gear with respect to said case.

8. The motion control system of claim 7, a sleeve, having a seal surface, a thrust surface, said sleeve circumscribing said cam, said thrust surface mated axially with said outer ring, said seal surface circumscribing a seal.

9. The motion control system of claim 8, said sleeve being threaded around the outside diameter, said gearset bore threaded to receive said sleeve.

10. The motion control system of claim 9, and said sleeve is selectively lockable with respect to said case.

11. The motion control system of claim 6, a motorized driving mechanism, rotatably affixed to said driving gear.

12. The motion control system of claim 11, and a control system for controlling said motorized driving mechanism.

13. The motion control system of claim 6, said sleeve having slots for accessing apertures in said rotatable cam.

14. The motion control system of claim 6, said driving gear having worm teeth.

15. The motion control system of claim 6, said driven gear having a top surface and a bottom surface, said surfaces having mounting means for an external device.

* * * * *